United States Patent
Feuerstacke

[19]

[11] Patent Number: 5,887,016
[45] Date of Patent: Mar. 23, 1999

[54] CHARGING DEVICE FOR ARC FURNACES

[75] Inventor: Ewald Feuerstacke, Dorsten, Germany

[73] Assignee: Mannesmann Aktiengesellschaft, Düsseldorf, Germany

[21] Appl. No.: 704,633
[22] PCT Filed: Feb. 15, 1995
[86] PCT No.: PCT/DE95/00235
§ 371 Date: Oct. 2, 1996
§ 102(e) Date: Oct. 2, 1996
[87] PCT Pub. No.: WO95/23947
PCT Pub. Date: Sep. 8, 1995

[30] Foreign Application Priority Data

Mar. 4, 1994 [DE] Germany .......................... 44 07 861.7

[51] Int. Cl.$^6$ ...................................................... F27D 3/00
[52] U.S. Cl. .............................................. 373/79; 373/86
[58] Field of Search ................................ 373/79, 81, 85, 373/86, 87

[56] References Cited

U.S. PATENT DOCUMENTS

| | | | |
|---|---|---|---|
| 2,518,404 | 8/1950 | Townsend | 373/79 |
| 3,900,117 | 8/1975 | Tuovinen et al. | 214/18 R |
| 4,402,083 | 8/1983 | Paskarbeit et al. | 373/79 |
| 4,490,922 | 1/1985 | Gorodetsky et al. | 34/1 |
| 4,569,057 | 2/1986 | Evangelista, Jr. | 373/81 |

*Primary Examiner*—Tu Ba Hoang
*Attorney, Agent, or Firm*—Cohen, Pontani, Lieberman & Pavane

[57] ABSTRACT

A charging device for closed arc furnaces having at least one electrode around which the charge material is concentrically fed into the furnace. Conveyor devices run in protected fashion in an annular chamber disposed above a furnace cover. A plurality of magnets are suspended from the conveyor devices into the upper vessel of the furnace. A material feeding device enters the upper vessel through a passage in the upper vessel wall. The passage is provided with a sealing device to prevent gases from the upper vessel from escaping or the material feeding device may be enclosed in a gas-tight lock. The magnets pick-up the charge material from the material feeding device and deposit it concentrically around the electrode.

10 Claims, 2 Drawing Sheets

CHARGING DEVICE FOR ARC FURNACES

BACKGROUND OF THE INVENTION

1. Field of the Invention

The invention relates to a charging device for closed arc furnaces, and more particularly, to a charging device for closed arc furnaces having at least one electrode, especially for melting scrap, in which the charge is fed concentrically and evenly all around the electrode.

2. Description of the Prior Art

Evenly loading the charge into the melting furnace contributes significantly to the reliable operation of the melting aggregate. This is especially true in the case of low-shaft furnaces that are designed with relatively high shafts and thus relatively high stock columns. While arc furnaces that can be closed with a cover are usually charged by means of a basket, there are various ways to load the material to be melted, including the flux agent, into the furnace head.

For example, German Patent Number DE 31 07 016 C2 discloses an arc furnace for melting ferriferous material, which loads the charge into the furnace by means of a reversible conveyor and discharge devices located at its end with associated charging tubes. In order to deposit the charge material fairly evenly on the stock column, it is disadvantageously necessary to have several charging tubes leading to the furnace head to fill a furnace.

Furthermore, a device for charging electrothermal melting furnaces is known from German Patent Number DE 33 14 943 C2, in which the charge is fed through the furnace roof concentrically to the electrode and evenly around the electrode. An annular chamber is provided, having a bottom with at least one closable opening that leads to the furnace vessel, through which the charge can be fed into the upper furnace vessel. The bottom of this annular chamber can be turned separately, so that the charge falls through the then opened opening into the furnace. In the charging device disclosed in DE 33 14 943 C2, the charge material falls from a great height onto the bottom of the empty annular chamber and there, when the bottom undergoes a turning movement, is spread over it, relatively, with high abrasion. In addition, this complicated device requires the movement of large and heavy parts, so that it is suitable only for relatively light bulk materials.

SUMMARY OF THE INVENTION

Is is accordingly an object of the present invention to create a simple and readily maintainable charging device, within which a ferriferous charge, especially scrap, can be deposited in a furnace head at a predetermined quantity, time and location.

According to the present invention, conveyor devices are run in a protected position in an annular chamber above the furnace cover. Suspended on these conveyor devices are magnets, which pick up a ferriferous charge from a material feeding device and then, while traveling concentrically around the electrode, unload the charge at any desired predetermined point in the furnace head. For this purpose, a level measurement device is provided to measure the level of the charge in the furnace. The level measurement device, which is embodied in the form of probes, for example, is used to control the discharge location of the individual magnets. Control can be exercised in such a way that the most even possible discharge level is achieved. Of course, targeted level variations can also be used in directing the charge.

The material feeding device and the magnets transport the charge, especially scrap, in a careful manner until it is finally deposited on the stock line.

The annular chamber is embodied in such a way that the aggressive furnace atmosphere does not reach the conveyor devices. This is ensured by the fact that the passage from the annular chamber to the furnace head, i.e. the slot in the furnace cover, is sealed. Furthermore, as needed, the interior of the annular chamber is kept at a slight overpressure relative to the pressure in the furnace head. For this purpose, elements that close the slot are provided on the furnace cover in the region of the slot. For example, glide plates that are taken along by the individual conveyor devices as they travel can be used. However, it is also possible to use sealing elements that either are elastic or are pressed away from the conveyors as the latter travel and pressed against the slot edge during the rest of the time.

In order to supply material to the furnace head, material feeding devices such as conveyor belts or chutes extend through the upper vessel wall in the area of the magnets. The heads of these feeding devices extend far enough into the furnace head that the metal material can be reliably picked up by the magnets.

If the area below the feeding device is to be charged, this can be done directly in the case of the conveyor belt; when a chute is used, a lid provided at the head end must be opened.

In order to prevent gas from emerging from the furnace head in the area of the material feeding device, either seals are provided in the upper vessel wall or the conveyor devices are located in a lock. When seals are used, elastic heat-resistant materials are advantageously selected, in the case of which, furthermore, impermeability is increased by a gas fog and abrasion is reduced, particularly by cooling.

When a lock is used, the lock has at least two cut-off elements. During the transport of material, one cut-off element is open and the other is closed in a gas-tight manner.

Suitable sealing of the material feeding devices ensures that no flue gas escapes from the furnace head except at intended locations.

The proposed charging device makes it possible to feed any desired quantity of material to a closed furnace without interrupting the melting process. Because of its lightweight design, the charging device can be constructed on the furnace head. When this is done, the upper furnace vessel can be lengthened as desired, with the desirable effect that the level of the stock column is freely selectable and can be made significantly higher than previously allowed.

The lightweight structure further permits the entire furnace vessel to be tilted at least to limited angular degrees. This is possible because of the outwardly-projecting feed devices, which allow loading at a precise spot, within certain limits.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention. An example of the invention is shown in the drawings and described in greater detail below.

BRIEF DESCRIPTION OF THE DRAWINGS

In the drawings in which like numerals are used to denote similar elements throughout the several views.

DETAILED DESCRIPTION OF THE PRESENTLY PREFERRED EMBODIMENTS

Figure 1:
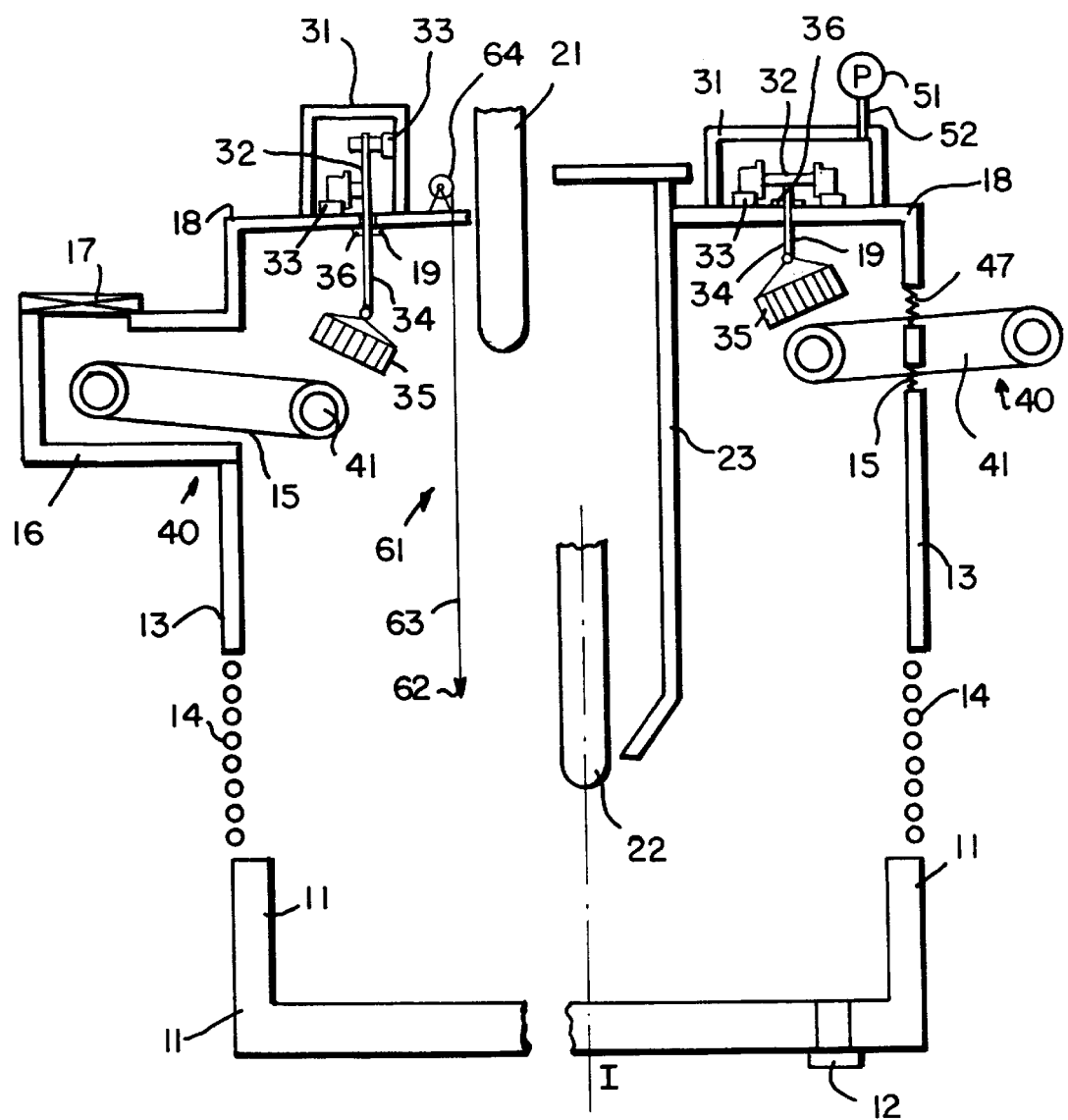
FIG. 1 is a cross-sectional view of a furnace using a conveyor belt as a material feeding device, constructed in accordance with the present invention.

FIG. 1 shows a lower vessel 11 of an electric arc furnace, on which a tap 12 is located. An upper vessel 13, which has a cooling area 14, is connected fixedly to the furnace vessel. The upper vessel 13 is closed in a gas-tight fashion by a furnace cover 18.

Through the furnace cover 18 are arranged an electrode 21 (on the left in FIG. 1), which is attached to a carrying device (not shown), and an electrode 22 (on the right in FIG. 1), which is positioned on a furnace main axis I and which projects out of an electrode holder 23 into the area of the lower furnace vessel 11.

An annular chamber 31 is arranged projecting to the outside or the inside on the furnace cover 18. In the annular chamber 31, there is a conveyor device 32 that can be moved on rails 33. The rails 33 can be arranged horizontally parallel, as shown on the right in FIG. 1, or at right angles to one another, as shown on the left in FIG. 1.

On the conveyor device 32, there is a suspension device 34, on which load magnets 35 are suspended. The load magnets 35 run through slots 19 that are provided in the furnace cover 18. The slots 19 can be closed by coverings 36 in a largely dust-tight manner.

In a preferred embodiment, glide plates are moved along by the conveyor device thereby sealing the annular chamber from the elements of the upper vessel of the furnace. In an alternative embodiment, elastic sealing elements interferingly press against the suspension device and the slot edge.

In the cylindrical mantle of the upper vessel 13, there are passages 15, through which the charge can be transported into the furnace interior, for example, by means of a conveyor belt 41. On the left in FIG. 1, the conveyor belt 41 is encompassed by a bulge 16, which has a cover 17. On the right in FIG. 1, the conveyor belt 41 is surrounded at the passage 15 by a seal 47, which largely prevents the emergence of flue gas. This seal can be improved by a device to generate a gas fog (not shown here in greater detail).

Attached to the annular chamber 31 is a pressure station with a pump 51 and a feed line 52, which can be used to keep the annular chamber dust-free and cool by producing a slight overpressure therein.

In the upper furnace vessel 13, there is a level measuring device 61 in the form of probes 62, which are attached to a cable 63 that is run via a winch 64.

Figure 2:
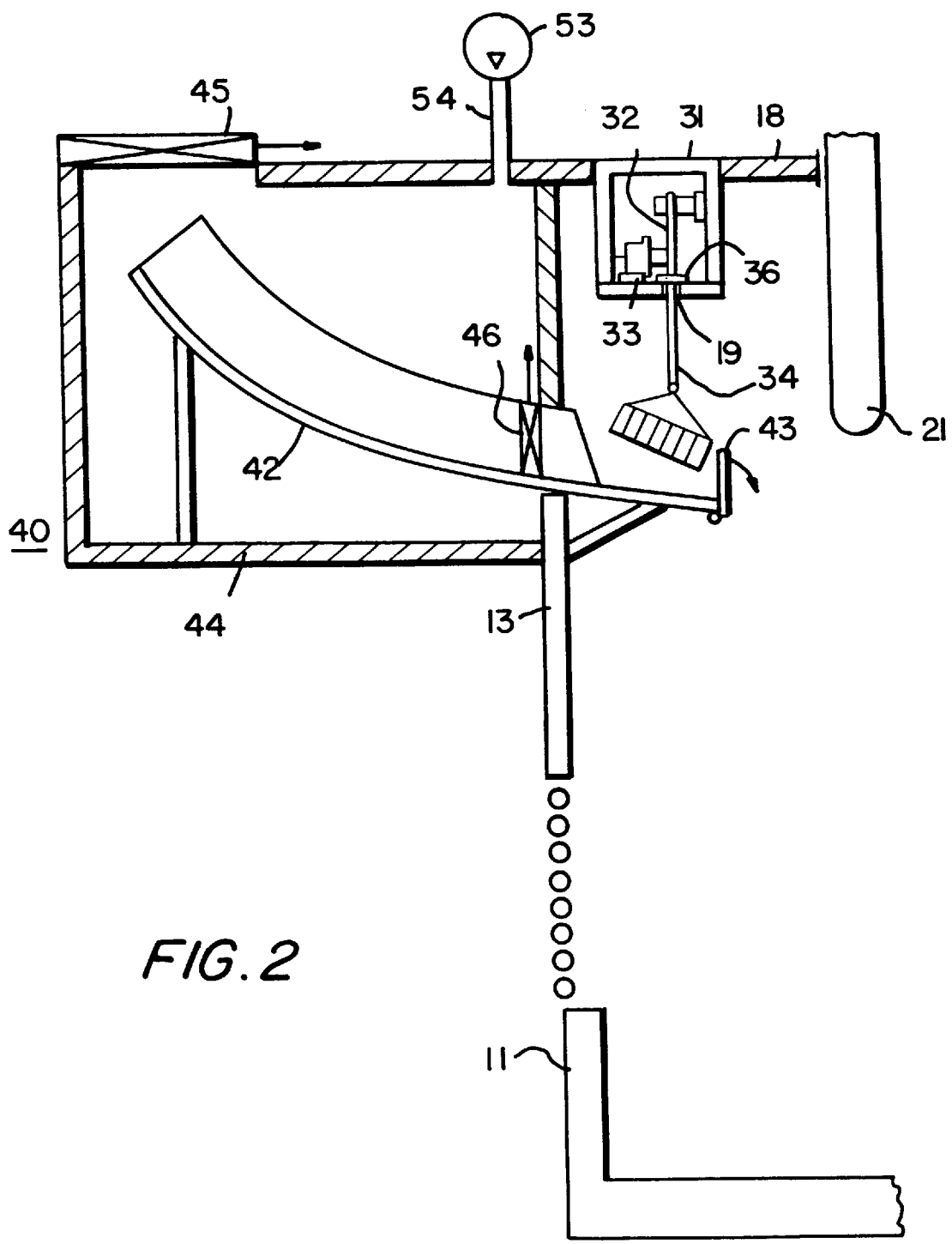
FIG. 2 is a partial cross-sectional view of a furnace using a chute as a material feeding device, constructed in accordance with the present invention.

FIG. 2 shows the material feeding device 40 in the form of a chute 42, which is arranged in a lock 44. The chute 42 has a lid 43 at its head end. The lock 44 has an outer lock opening 45 and an inner lock opening 46.

The lock 44 is also connected via a line 54 to a pump 53 for the purpose of generating a slight overpressure therein.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

I claim:

1. A charging apparatus in combination with a closed arc furnace operable for melting a charge material, said furnace having a furnace cover, a main axis, an upper vessel and at least one electrode, said apparatus comprising:

an annular chamber defined on said furnace cover;

a conveyor device operatively disposed within said annular chamber substantially concentric to said main axis;

a plurality of controllable load magnets suspended from said conveyor device for movement concentrically about said main axis with operation of said conveyor device; and a material feeding device mountable for projecting laterally into said upper vessel of said furnace and operable for carrying charge material into said upper vessel of said furnace;

said plurality of load magnets being disposed in suspended relation from the conveyor device and at a predetermined spacing from said material feeding device for magnetically collecting charge material from said material feeding device as said plurality of load magnets move within said conveyor device.

2. The combination of claim 1, wherein said furnace cover has a circular slot defined therethrough having a slot edge, said apparatus further comprising a rod-shaped device connecting said plurality of load magnets to said conveyor device and passing through said circular slot.

3. The combination of claim 2, said apparatus further comprising a plurality of coverings disposed between said plurality of load magnets and said conveyor device, said coverings interferingly contacting said rod-shaped device and said slot edge for preventing entry into said annular chamber of dust particles from said upper vessel.

4. The combination of claim 3, wherein said plural coverings comprise circular glide plates.

5. The combination of claim 3, further comprising:

a pump; and a supply line connecting said annular chamber to said pump;

said pump being operable for maintaining an annular chamber pressure in said annular chamber greater than a furnace pressure in said furnace.

6. The combination of claim 1, wherein said material feeding device comprises an endless conveyor belt.

7. The combination of claim 6, wherein said upper vessel of said furnace has a side wall having a defined passage therethrough and having a periphery, said passage having a seal peripherally displaced therein, and said conveyor belt sealingly passing through said passage and said seal into said upper vessel so as to prevent escape of gas from said upper vessel.

8. The combination of claim 7, wherein said seal comprises a heat-resistant material formed to fit within said passage.

9. The combination of claim 1, wherein said material feeding device comprises a chute.

10. The combination of claim 9, further comprising a gas-tight lock within which said chute is disposed.

* * * * *